US012643490B2

(12) United States Patent (10) Patent No.: US 12,643,490 B2
Emerson et al. (45) Date of Patent: Jun. 2, 2026

(54) GARNISH ASSEMBLY AND METHOD

(71) Applicant: Honda Motor Co., Ltd., Tokyo (JP)

(72) Inventors: Christopher Wayne Emerson, Dublin, OH (US); David J. Rose, West Mansfield, OH (US); Jesse W. Schlabach, Marysville, OH (US); Hirofumi Takemoto, Dublin, OH (US); Jason S. Borland, Raymond, OH (US); Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 509 days.

(21) Appl. No.: 18/192,996

(22) Filed: Mar. 30, 2023

(65) Prior Publication Data

US 2024/0326720 A1 Oct. 3, 2024

(51) Int. Cl.
B60R 13/04 (2006.01)

(52) U.S. Cl.
CPC .................................... B60R 13/04 (2013.01)

(58) Field of Classification Search
CPC ................................. B60R 13/04; B60R 13/06
USPC ...................................................... 296/193.06
See application file for complete search history.

(56) References Cited

U.S. PATENT DOCUMENTS 6,974,152 B2 12/2005 Hanjono
8,419,112 B2 4/2013 Matsuoka

2005/0248863 A1 * 11/2005 Kawanishi ................ B60R 1/06
359/872
2018/0154753 A1 * 6/2018 Katayama ............... B60R 13/04
2019/0118752 A1 * 4/2019 Tay ..................... B60R 13/0243

FOREIGN PATENT DOCUMENTS

| CN | 106542001 | 3/2017 |
| CN | 107672676 | 2/2018 |
| CN | 209063865 | 7/2019 |
| CN | 112519551 | 3/2021 |
| JP | 2007090999 | 4/2007 |
| JP | 4171143 | 10/2008 |
| JP | 4199601 | 12/2008 |
| JP | 2016137782 | 8/2016 |
| JP | 6048331 | 12/2016 |
| JP | 2018095173 A | * 6/2018 |
| WO | 2017159746 | 9/2017 |

OTHER PUBLICATIONS

Yutaka, Japanese Patent No. 2018095173 A, English Translation. Aug. 2025. (Year: 2018).*

* cited by examiner

*Primary Examiner* — Caroline N Butcher
(74) *Attorney, Agent, or Firm* — Rankin, Hill & Clark LLP

(57) ABSTRACT

A garnish assembly and method for a vehicle includes a garnish housing having a show surface delineated by an end edge surface for mounting on the vehicle. The garnish assembly further includes a seal extending along an entirety of the end edge surface and a doghouse structure adapted to mount the garnish housing and the seal to the vehicle. The seal is secured along the end edge surface wherein the end-to-end length of the seal matches an end-to-end length of the end edge surface. The doghouse structure is secured to the garnish housing so that attachment to the doghouse structure to the vehicle mounts the seal and the garnish housing to the vehicle.

19 Claims, 7 Drawing Sheets

GARNISH ASSEMBLY AND METHOD

BACKGROUND

Garnishes are often used in vehicle assembly to provide a more pleasing aesthetic look, to prevent water intrusion, cover connection points on the vehicle, etc. One such use of a garnish is to house or overlap various connections provided or exposed on the exterior of the vehicle. One example of such a garnish is to cover the connection location at which a side view mirror on a vehicle is secured to the vehicle's frame or body. One means for connecting a garnish to a vehicle includes the use of a doghouse structure. By way of example, a doghouse structure can be used with an associated clip to secure to the vehicle's body and the garnish can then be connected to the doghouse structure. An example connection between a garnish and a doghouse structure is by heat staking. Sometimes a seal can be provided in association with the garnish for sealing against the elements and/or further improving vehicle aesthetics.

BRIEF DESCRIPTION

According to one aspect, a garnish assembly for a vehicle includes a garnish housing having a show surface delineated by an end edge surface for mounting on the vehicle. The garnish assembly further includes a seal extending along an entirety of the end edge surface and a doghouse structure adapted to mount the garnish housing and the seal to the vehicle.

According to another aspect, a garnish assembly for covering a mirror attachment area on a vehicle includes a garnish housing having an end edge surface mounted in abutment with a fender of the vehicle. The garnish assembly further includes a seal extending along the end edge surface and a doghouse structure mounted to the fender. The doghouse structure is secured directly to the seal and the garnish housing to thereby mount the garnish housing to the vehicle.

According to a further aspect, a garnish assembly method for a vehicle includes providing a garnish housing having a show surface delineated by an end edge surface for mounting on the vehicle, providing a seal having an end-to-end length and providing a doghouse structure. The method further includes securing the seal along the end edge surface wherein the end-to-end length of the seal matches an end-to-end length of the end edge surface. The method also includes securing the doghouse structure to the garnish housing so that attachment to the doghouse structure to the vehicle mounts the seal and the garnish housing to the vehicle.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately," means a reasonable amount of deviation of the modified word is contemplated such that the end result is not significantly changed.

Figure 1:
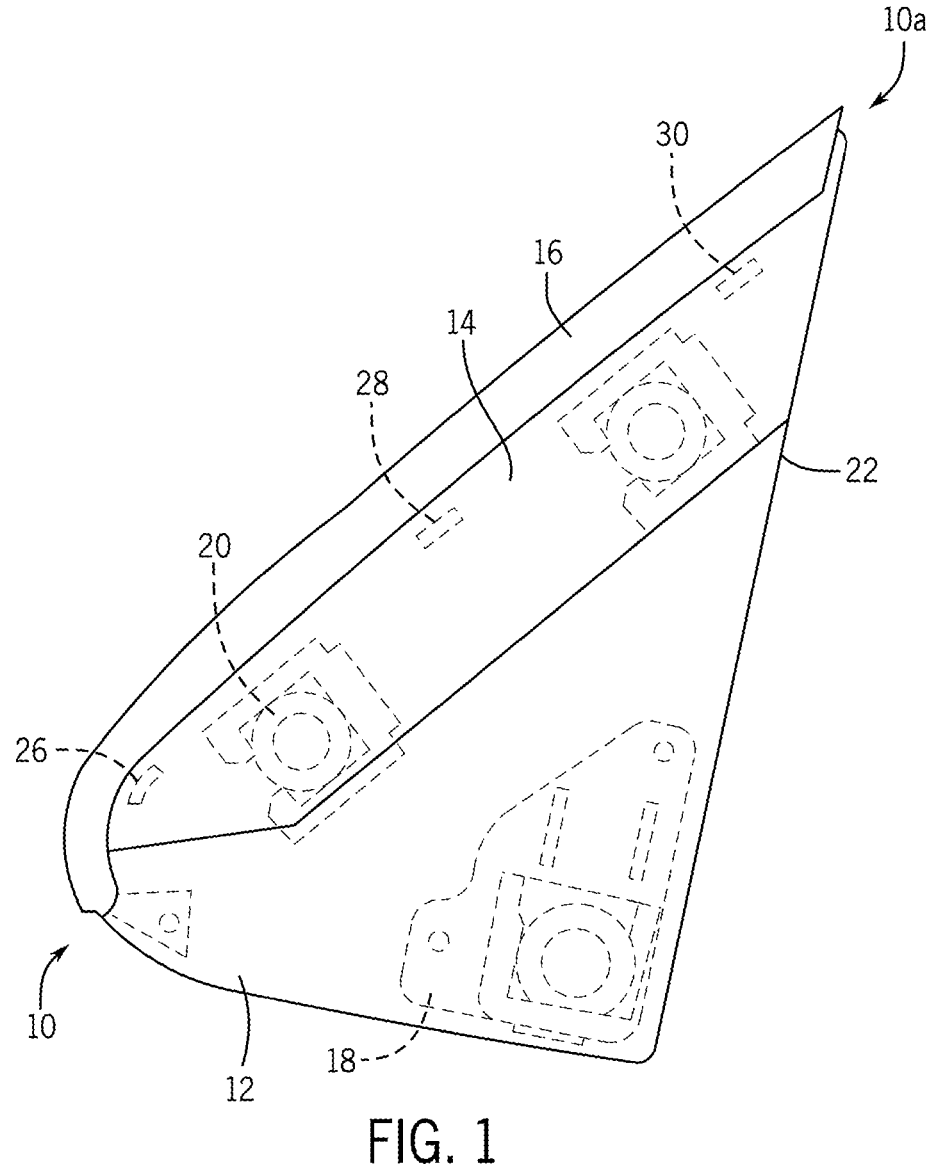
FIG. 1 is a schematic view of a known garnish assembly for a vehicle having a garnish housing, a seal, doghouse structures, and a secondary garnish housing.

With reference now to the drawings, wherein like numerals refer to like parts throughout the several views, FIG. 1 schematically illustrates a known garnish assembly 10 for a vehicle. The known garnish assembly 10 includes a primary garnish housing 12 and a secondary garnish housing 14 secured to the primary garnish housing 12. Additionally, the garnish assembly 10 includes a seal 16 disposed along an upper area 10a of the garnish assembly 10 that is held in position by the secondary garnish housing 14. Also, the garnish assembly 10 includes a lower doghouse structure 18 and upper doghouse structures 20, 22 with all doghouse structures 18, 20, 22 independently provided relative to one another. The doghouse structures 18, 20, 22 are secured to a fender 24 (FIG. 2) of the vehicle on which the garnish assembly 10 is disposed and the garnish housing 12 is secured to the doghouse structures 18, 20, 22.

Figure 2:
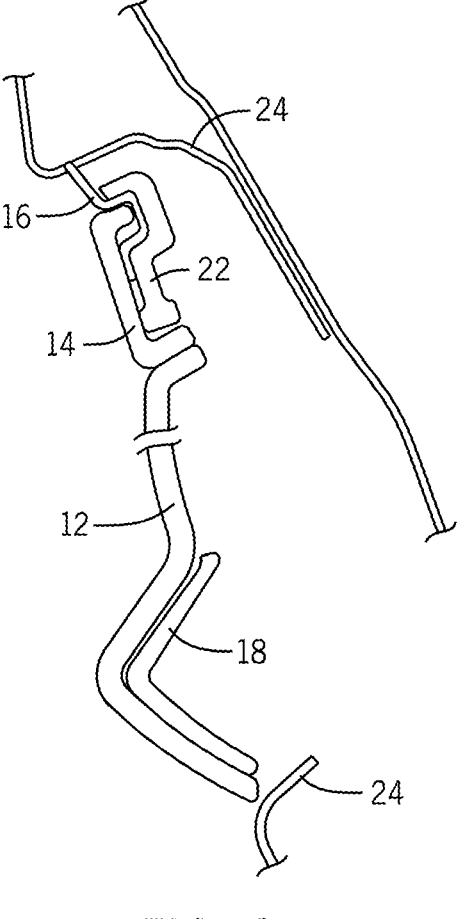
FIG. 2 is a schematic cross-section view of the garnish assembly of FIG. 1 showing the secondary garnish housing securing the seal to the vehicle and covering upper ones of the doghouse structure, and showing the lack of any seal at an underside location at which a lower one of the doghouse structures secures the garnish housing to the vehicle.
Figure 3:
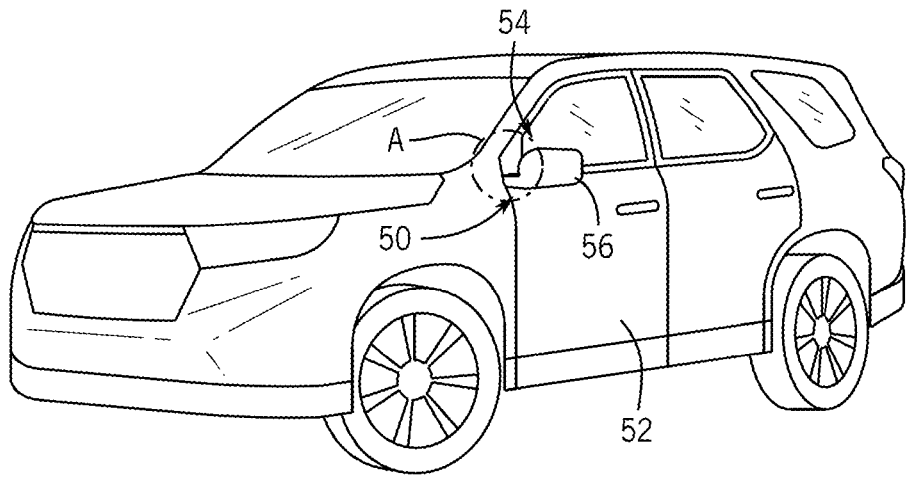
FIG. 3 is a schematic view of a vehicle having a side view mirror attached to the vehicle at a mirror attachment location.
Figure 4:
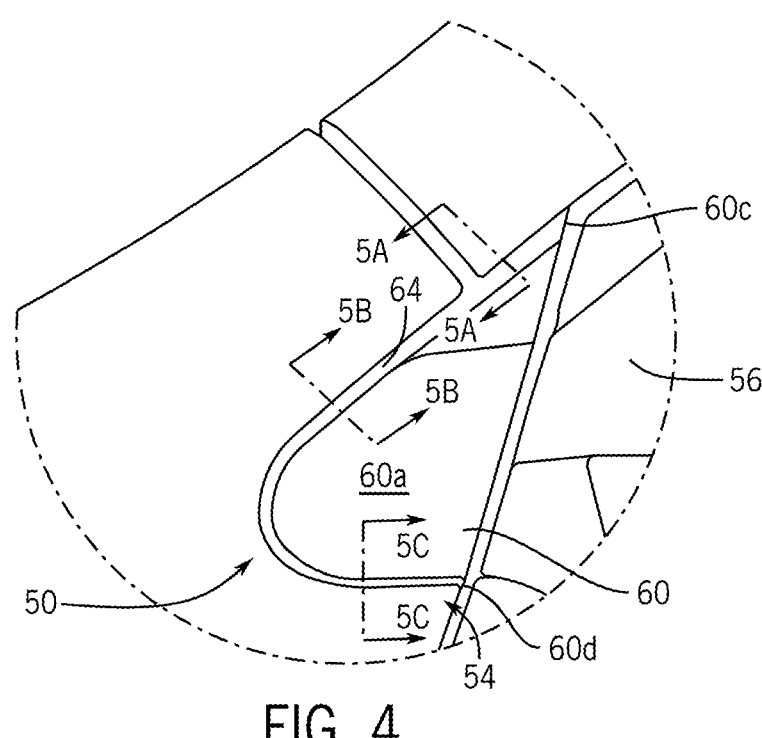
FIG. 4 is a partial enlarged view taken at location A of FIG. 3 showing a garnish assembly having a garnish housing, a seal and doghouse clip structures (shown in hidden lines) according to an exemplary embodiment.
Figures 5A, 5B:
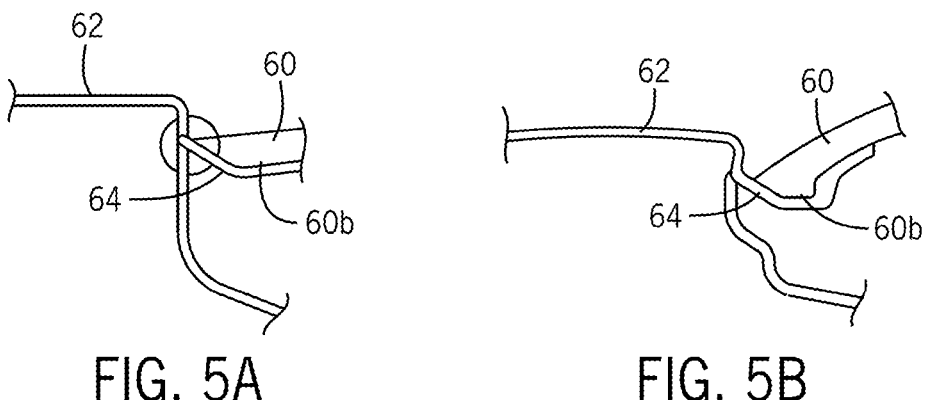
FIGS. 5A, 5B, and 5C are schematic cross-section views taken, respectively, at the lines 5A-5A, 5B-5B, and 5C-5C of FIG. 4.
Figure 5C:
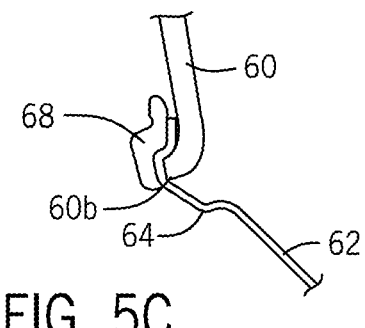
Figure 6:
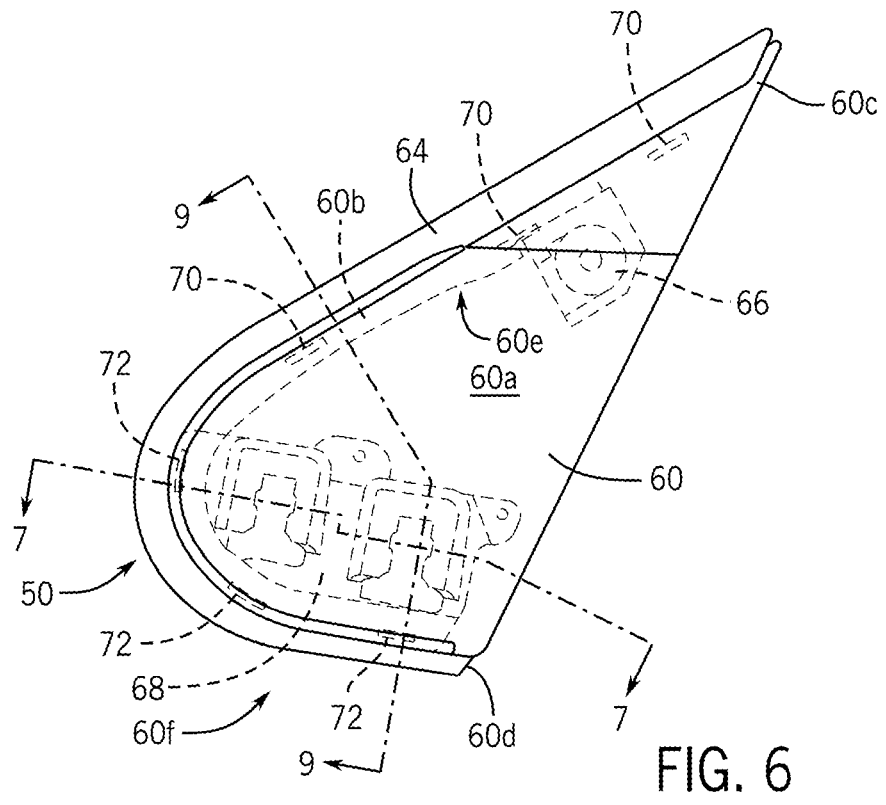
FIG. 6 is a schematic view of the garnish assembly of FIG. 4 shown with doghouse structures securing the garnish housing to the vehicle.

The secondary garnish housing 14 is specifically provided to overlay and hide the upper doghouse structures 20, 22. Additionally, the secondary garnish housing 14 can clinch the seal 16 as best shown in FIG. 2. In particular, the secondary garnish housing 14 can be heat staked to the primary garnish housing 12 at heat stake locations 26, 28, 30. Also, though not shown, the primary garnish housing 12 can be heat staked to the lower doghouse structure 18. A limitation of the known garnish assembly 10 is that the seal 16 is only provided along the upper area 10a and optionally heat staked to the secondary garnish housing 14 and/or the primary garnish housing 12 at the heat stake locations 26, 28, 30. In particular, as best shown in FIG. 2, the seal 16 is only present at the upper area 10a and no seal is disposed at the location where the primary garnish housing 12 meets the fender 24 adjacent the lower doghouse structure 18, i.e., along the lower edge or portion of the garnish assembly 10. Another limitation of the known garnish assembly 10 is that its surface geometry is required to be simplified to achieve the desired fit and finish on the vehicle. As such, the overall size of the known garnish assembly 10 is larger and/or more complex.

With reference now to FIGS. 3, 4, 5A-5C and 6, a garnish assembly 50 is shown for a vehicle 52 according to one exemplary embodiment of the present disclosure. In particular, the garnish assembly 50 is provided for covering a mirror attachment location or area 54 on the vehicle 52 at which a side view mirror 56 is mounted on the vehicle 52. The garnish assembly 50 includes a garnish housing 60 having a show surface 60a delineated by an end edge surface 60b (see FIGS. 5A-5C and 6) for mounting on the vehicle 52. The end edge surface 60b is mounted in abutment with a fender 62 of the vehicle 52. The end edge surface 60b can extend from an upper terminal end 60c to a lower terminal end 60d.

The garnish assembly 50 can further include a seal 64 extending along an entirety of the end edge surface 60b. More particularly, the seal 64 can extend along the end edge surface 60b from the upper terminal end 60c to the lower terminal end 60d (i.e., along an entirety of the end edge surface 60b). The seal 64 can be retained by the end edge surface 60b. More particularly, the end edge surface 60b of the garnish housing 60 can clinch or capture the seal 64 against the fender 62 of the vehicle 52.

The garnish assembly 50 can additionally include one or more doghouse structures, such as upper doghouse structure 66 and lower doghouse structure 68, adapted to mount the garnish housing 60 and the seal 64 to the vehicle 52, particularly to the fender 62 of the vehicle 52, at the mirror attachment location or area 54. More particularly, each of the doghouse structure 66, 68 can be mounted to the fender 62. Also, the doghouse structures 66, 68 can be secured directly to the seal 64 and the garnish housing 60 to thereby mount the seal 64 and the garnish housing 60 to the vehicle 52. Thus, the seal 64 can be sandwiched between the end edge surface 60b of the garnish housing 60 and the lower doghouse structure 68. In the illustrated embodiment, the garnish housing 60 fully encapsulates or covers both the lower doghouse structure 68 and the upper doghouse structure 66.

In one embodiment, one of the garnish housing 60 and the doghouse structure (e.g., doghouse structures 66 and/or 68) includes at least one heat stake (e.g., heat stakes 70, 72) and the other of the garnish housing 60 and the doghouse structure (doghouse structures 66 and/or 68) includes at least one heat stake aperture (e.g., heat stake apertures 76). More particularly, in the illustrated embodiment, the garnish housing 60 includes a plurality of heat stakes 70, 72, including upper heat stakes 70 disposed adjacent the upper portion 60e and lower heat stakes 72 disposed adjacent the lower portion 60f. The lower heat stakes 72 are received through heat stack apertures 76 defined in the lower doghouse structure 68 (see FIG. 8). Optionally, though not shown in the illustrated embodiment, one of the heat stakes 70 could be received through a heat stake aperture defined in the upper doghouse structure 66. After receipt through heat stake apertures (e.g., heat stake apertures 76), the application of heat is applied to the heat stakes 70, 72 to form a permanent connection as is known and understood by those skilled in the art.

In addition, the seal 64 can include at least one seal heat stake aperture (e.g., seal heat stake apertures 78) that receives the at least one heat stake (e.g., heat stakes 70, 72) of the garnish housing 60. More particularly, in the illustrated embodiment, the seal 64 includes a plurality of seal heat stake apertures 78 disposed along a length (also referred to herein as an end-to-end dimension) of the seal 64. The heat stakes 70 disposed along the upper portion 60e and the heat stakes 72 disposed along the lower portion 60f are received through seal heat stake apertures 78, so that the seal 64 is heat staked along its entire length to the garnish housing 60. More particularly, the heat stakes 72 are received through both the heat stake apertures 76 of the lower doghouse structure 68 and through adjacent ones of the seal heat stake apertures 78.

More particularly, in the illustrated embodiment, the at least one heat stake can be a plurality of heat stakes 72, 74 disposed along the end-to-end dimension of the end edge surface 60b of the garnish housing 60. As used herein, the end-to-end dimension of the end edge surface 60b can be a dimension that extends along a length of the end edge surface 60b from the upper terminal end 60c to the lower terminal end 60d. By this arrangement, the garnish housing 60 includes the plurality of heat stakes 70, 72 disposed along the end-to-end dimension of the end edge surface 60b and these heat stakes 70, 72 are received within the seal heat stake apertures 78 provisioned along an entirety of the seal 64.

Figure 7:
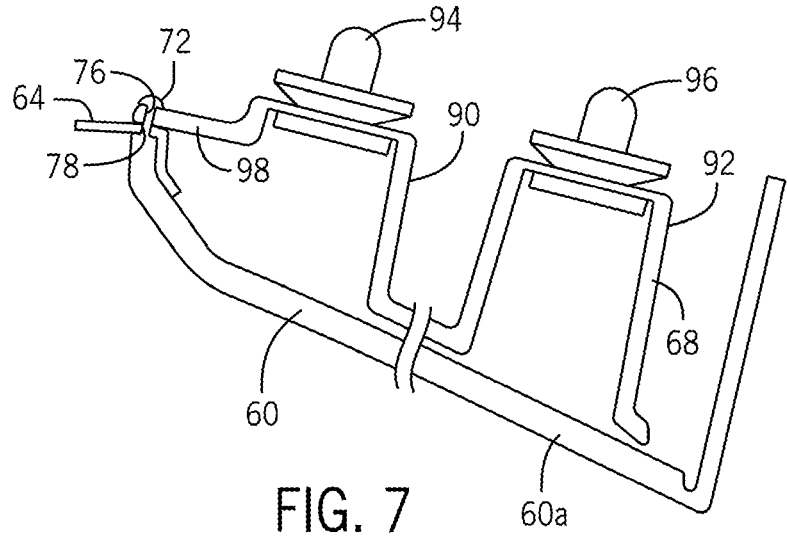
FIG. 7 is a schematic cross-section view taken at the line 7-7 of FIG. 6.
Figure 9:
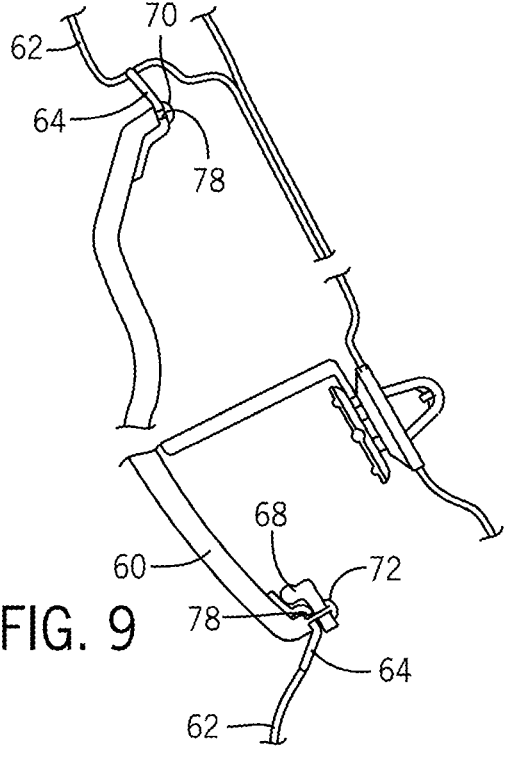
FIG. 9 is a schematic cross-section view taken at the line 9-9 of FIG. 6.

With particular reference to FIG. 7, one of the heat stakes 72 is illustrated passing through one of the seal heat stake apertures 78 and through one of the heat stake apertures 76 defined in the lower doghouse structure 68. With specific reference to FIG. 9, another of the heat stakes 72 is illustrated passing through one of the seal heat stake apertures 78 and through one of the heat stake apertures 76 defined in the lower doghouse structure 68. Also shown in FIG. 9 is one of the heat stakes 70 passing through one of the seal heat stake apertures 78 defined in the seal 64 (and not passing through any aperture in any doghouse structure).

Figure 8:
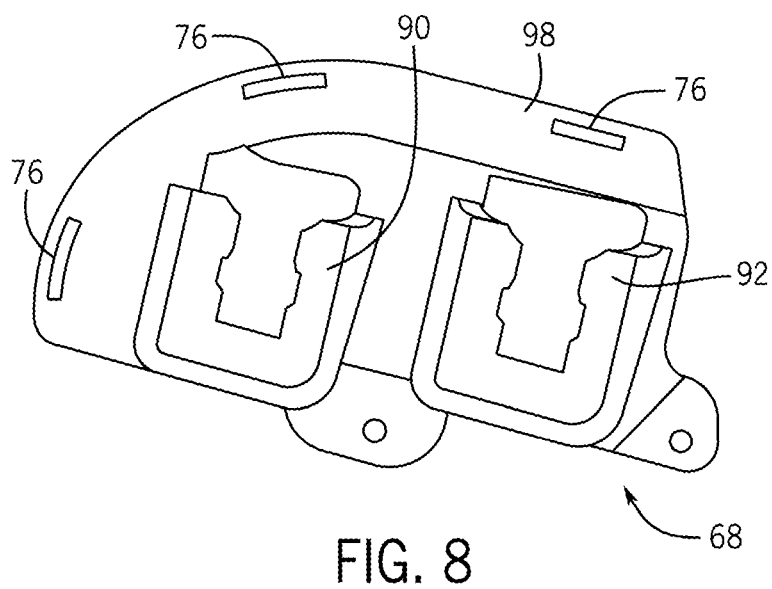
FIG. 8 is a schematic perspective view of a lower doghouse structure of the garnish assembly of FIG. 6.

With reference to FIGS. 7 and 8, the lower doghouse structure 68 is shown in more detail. In particular, the lower doghouse structure 68 of the illustrated embodiment includes a pair of spaced apart doghouse clip structures or structure portions 90, 92 with doghouse clips 94, 96 respectively received therein for securing the doghouse structure 68 to the vehicle 52. In particular, the clip structures 90, 92 can be a pair of integrally formed and spaced apart clip structures for slidably receiving the associated clips 94, 96 therein, with the associated clips 94, 96 connecting to the fender 62 of the vehicle 52. As shown, the doghouse structure 68 includes an apron portion 98 along which the heat stake apertures 76 are disposed.

Advantageously, the seal 64 is fully secured to the garnish housing 60 via the heat stakes 70, 72 and the lower doghouse structure 68 ensures consistent fit and finish of the garnish housing 60 to the vehicle 52. Also advantageously, the overall size of the garnish assembly 50 can be small as all attachment points (i.e., heat stakes 70, 72) are included within the garnish housing 60 so that no secondary garnish housing (e.g., secondary garnish housing 14 of known garnish assembly 10 of FIGS. 1 and 2) is needed. Since the lower doghouse structure 68 is heat staked to the garnish housing 60, the seal 64 is secured around an entirety of the garnish housing 60 (i.e., the seal 64 is secured along its entire length to the end edge surface 60b along an end-to-end dimension of the end edge surface 60b), which also ensures consistent fit and finish as well as satisfactory retention. The lower doghouse structure 68 also ensures that the seal 64 remains clinched between and retained in its proper position.

Figure 10:
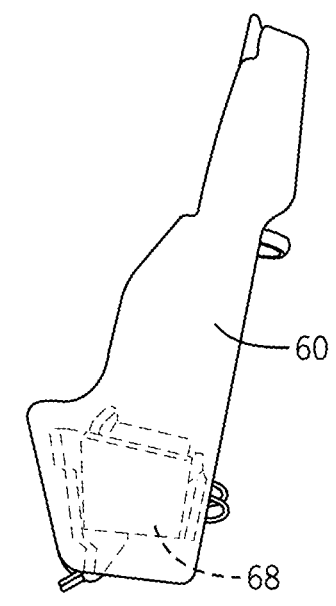
FIG. 10 is a schematic plan view showing a profile of the garnish housing of FIG. 6.

With additional reference to FIG. 10, retention of the garnish housing 60 to the vehicle 52 is also improved as the doghouse clip structures 90, 92 are not able to move relative to one another. Advantageously, as illustrated, the outer geometry of the garnish housing 60 is able to follow more desired styling because the lower doghouse structure 68 allows for more complex molds as, unlike the known garnish assembly 10, there is no need to include slides or lifters for the doghouses.

Figure 11:
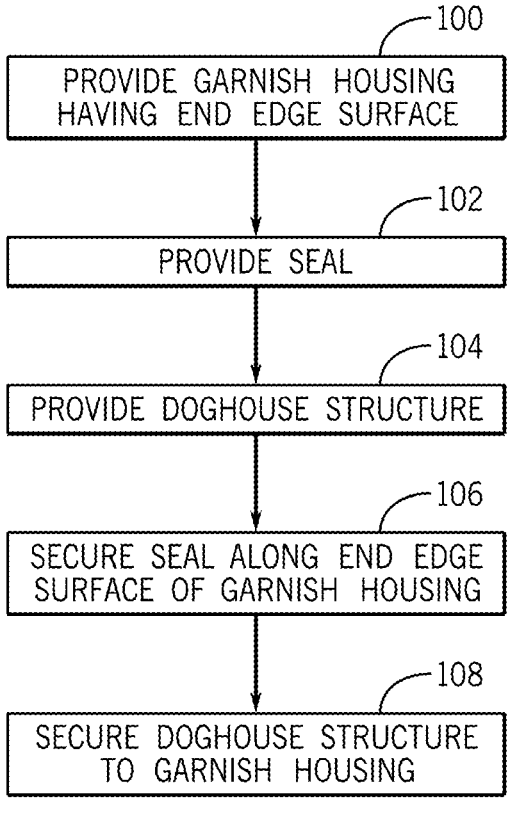
FIG. 11 is a process flow diagram of a garnish assembly method for a vehicle according to an exemplary embodiment of the present disclosure.

With reference now to FIG. 11, a garnish assembly method for a vehicle will now be described. In particular, the garnish assembly method will be described in association with the garnish assembly 50 and vehicle 52 described hereinabove, though this is not required and the garnish assembly method could be used with other garnish assemblies 50. In the method, at 100, the garnish housing 60 having the show surface 60*a* delineated by the end edge surface 60*b* for mounting to the vehicle 52 is provided. At 102, the seal 64 having its end-to-end length is provided. At 104, the doghouse structure 68 is provided. Additionally, at 104, the upper doghouse structure 66 could also be provided.

At 106, the seal 64 is secured along the end edge surface 60*b* of the garnish housing 60 wherein the end-to-end length of the seal 64 matched the end-to-end length of the end edge surface 60*b*. At 108, the doghouse structure 68 is secured to the garnish housing 60, such as via the heat stakes 72 being received in the heat stake apertures 76, so that attachment of the doghouse structure 68 to the vehicle 52 mounts the seal 64 and the garnish housing 60 to the vehicle 52.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A garnish assembly for a vehicle, comprising:
a garnish housing having a show surface delineated by an end edge surface for mounting on the vehicle;
a seal extending along an entirety of the end edge surface from an upper terminal end to a lower terminal end of the end edge surface;
the garnish housing including a plurality of heat stakes disposed along an end-to-end dimension of the end edge surface;
the seal including a plurality of seal heat stake apertures that receive the plurality of heat stakes; and
a doghouse structure adapted to mount the garnish housing and the seal to the vehicle, the doghouse structure including a plurality of heat stake apertures;
wherein at least a portion of the plurality of heat stakes extend through both the seal heat stake apertures and the heat stake apertures of the doghouse structure to secure the seal in sandwiched relation between the end edge surface and the doghouse structure.

2. The garnish assembly of claim 1 wherein at least a portion of the plurality of heat stakes are also received in heat stake apertures defined in the doghouse structure.

3. The garnish assembly of claim 2 wherein the plurality of heat stakes is spaced along an entirety of the end edge surface.

4. The garnish assembly of claim 1 wherein the doghouse structure includes a pair of spaced apart doghouse clip structures with doghouse clips respectively received therein for securing the doghouse structure to the vehicle.

5. The garnish assembly of claim 1 wherein the seal is sandwiched between the end edge surface of the garnish housing and the doghouse structure.

6. The garnish assembly of claim 1 wherein the doghouse structure mounts the garnish and the seal to a fender of the vehicle at a mirror attachment location on the vehicle.

7. The garnish assembly of claim 1 wherein the garnish housing fully encapsulates the doghouse structure such that the doghouse structure is not visible from an exterior of the vehicle.

8. The garnish assembly of claim 1 wherein the plurality of heat stakes are integrally formed with the garnish housing as a single molded piece.

9. The garnish assembly of claim 1 wherein the end edge surface clinches the seal against the fender of the vehicle when the doghouse structure is mounted to the vehicle.

10. The garnish assembly of claim 1 consisting of only the garnish housing, the seal, and the doghouse structure, without any secondary garnish housing.

11. The garnish assembly of claim 1 wherein the plurality of heat stakes extends substantially perpendicular to the end edge surface.

12. A garnish assembly for covering a mirror attachment area on a vehicle, comprising:
a garnish housing having an end edge surface mounted in abutment with a fender of the vehicle, the end edge surface extending from an upper terminal end to a lower terminal end;
a seal extending along an entirety of the end edge surface from the upper terminal end to the lower termina end;
the seal including a plurality of seal heat stake apertures, and
a doghouse structure mounted to the fender, the doghouse structure secured directly to the seal and the garnish housing to thereby mount the garnish housing to the vehicle,
wherein the garnish housing includes a plurality of heat stakes extending from the end edge surface and received through the seal heat stake apertures and through heat stake apertures defined in the doghouse structure to secure the seal, garnish housing, and doghouse structure together.

13. The garnish assembly of claim 12 wherein the doghouse structure includes a pair of integrally formed and spaced apart clip structures for slidably receiving associated clips therein with the associated clips connecting to the fender of the vehicle.

14. The garnish assembly of claim 12 wherein the doghouse structure is a lower doghouse structure and the garnish assembly includes an upper doghouse structure, wherein the garnish housing fully encapsulates both the lower doghouse structure and the upper doghouse structure.

15. The garnish assembly of claim 12 wherein the seal provides a water-tight barrier along an entirety of an interface between the garnish housing and the fender.

16. The garnish assembly of claim 12 wherein the doghouse structure comprises a pair of integrally formed and spaced apart clip structures.

17. A garnish assembly method for a vehicle, comprising:
providing a garnish housing having a show surface delineated by an end edge surface for mounting on the vehicle, the garnish housing including a plurality of heat stakes extending from the end edge surface;
providing a seal having an end-to-end length, the seal including a plurality of seal heat stake apertures;
providing a doghouse structure having a plurality of heat stake apertures;
securing the seal along the end edge surface wherein the end-to-end length of the seal matches an end-to-end length of the end edge surface from an upper terminal end to a lower terminal end; and securing the doghouse structure to the garnish housing by heat staking with the plurality of heat stakes extending through both the seal heat stake apertures and the heat stake apertures of the doghouse structure so that attachment of the doghouse structure to the vehicle mounts the seal and the garnish housing to the vehicle with the seal sandwiched between the end edge surface and the doghouse structure.

18. The method of claim 17 wherein heat staking the doghouse structure and the garnish housing together includes heat stacking the seal in sandwiched relation between the doghouse structure and the garnish housing.

19. The method of claim 17 wherein the garnish housing, seal, and doghouse structure are secured together before mounting to the vehicle as a pre-assembled unit.

\* \* \* \* \*